(12) United States Patent
Herrmann et al.

(10) Patent No.: US 7,050,415 B2
(45) Date of Patent: May 23, 2006

(54) WIRELESS NETWORK WITH A SELECTION OF TRANSPORT FORMAT COMBINATIONS

(75) Inventors: Christoph Herrmann, Aachen (DE); Josef Wasel, Bedburg (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 850 days.

(21) Appl. No.: 10/014,859

(22) Filed: Nov. 13, 2001

(65) Prior Publication Data

US 2002/0085531 A1    Jul. 4, 2002

(30) Foreign Application Priority Data

Nov. 14, 2000 (DE) .................... 100 56 360
Dec. 21, 2000 (DE) .................... 100 64 379

(51) Int. Cl.
*H04Q 7/24* (2006.01)

(52) U.S. Cl. .................... 370/338; 370/468; 370/232

(58) Field of Classification Search ............ 370/437, 370/468, 470, 471, 473, 477, 538
See application file for complete search history.

(56) References Cited

U.S. PATENT DOCUMENTS

| | | | | |
|---|---|---|---|---|
| 6,510,137 | B1* | 1/2003 | Belaiche | 370/232 |
| 6,760,327 | B1* | 7/2004 | Manchester et al. | 370/364 |
| 6,845,100 | B1* | 1/2005 | Rinne | 370/395.43 |
| 6,850,540 | B1* | 2/2005 | Peisa et al. | 370/468 |
| 6,891,854 | B1* | 5/2005 | Zhang et al. | 370/468 |

OTHER PUBLICATIONS

3$^{RD}$ Generation Partnership Project (3GPP) Technical Specification Group (TSG) RAN, Working Group 2 (WG2); Radio Interface Protocol Architecture, TS 25.302 V3.6.0) (Sep. 2000): Techinical Specification Group Radio Access Network; Services Provided by the Physical Layer (Release 1999).

"Universal Mobile Telecommunication System (UMTS); Radio Interface Protocol Architecture (3GPP TS 25.301 version 3.6.0 Release 1999)" ETSI TS 25.301 V3.6.0, Sep. 2000, pp. 1-46.

* cited by examiner

*Primary Examiner*—Wellington Chin
*Assistant Examiner*—Andrew C. Lee
(74) *Attorney, Agent, or Firm*—Kevin H. Fortin

(57) ABSTRACT

A wireless network includes a radio network controller and a plurality of terminals which are provided for transmitting useful data over logic channels which have different priorities, which are mapped onto exactly one transport channel, respectively. The data transmission over a plurality of combined (multiplexed) transport channels is determined by transport format combinations. The respective most favorable transport format combination is selected at the beginning of a radio frame, given the packet data units waiting in the buffers of the logic channels. Further, the logic channels are sorted while their priorities, their buffer occupancy and the transmission time interval of the associated transport channel are taken into account.

20 Claims, 4 Drawing Sheets

Figure 1:
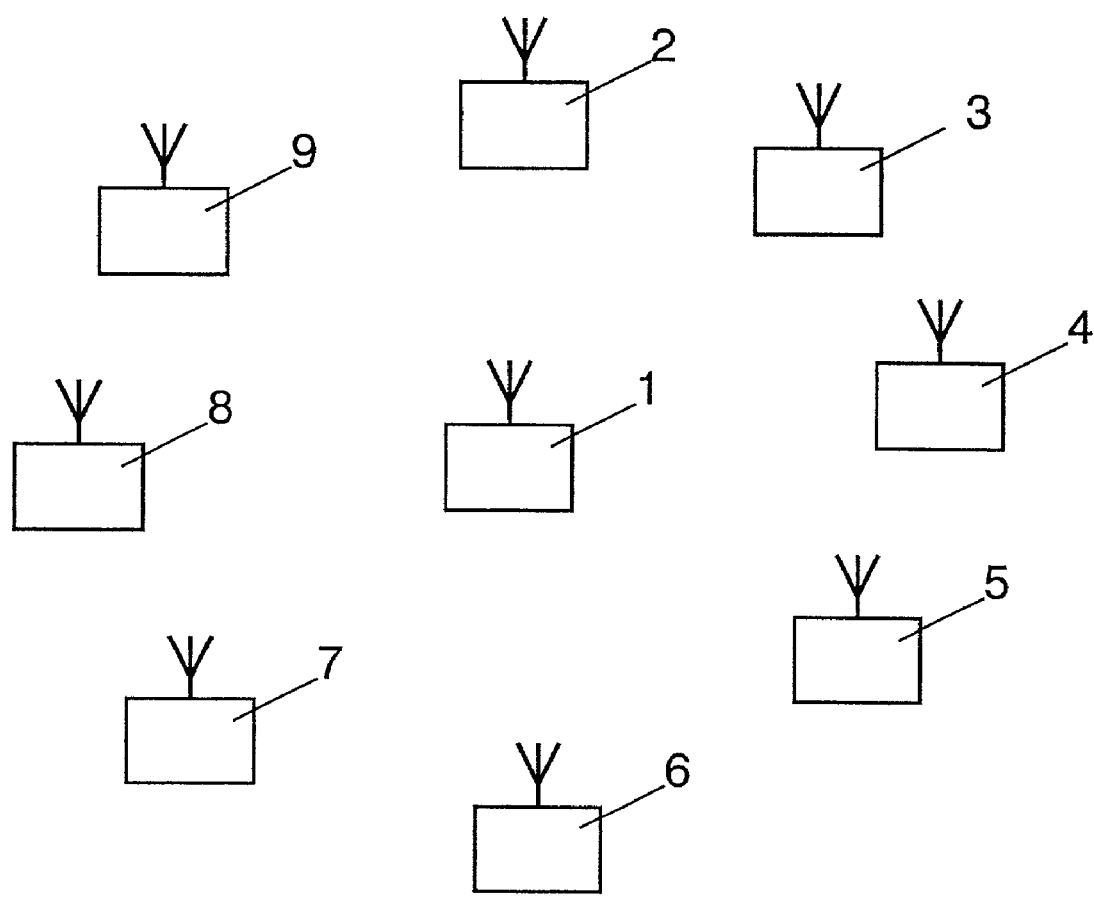

| ID | BO | TTI |
|----|----|-----|
| a  | 7  | 10  |
| b  | 3  | 40  |
| c  | 3  | 20  |
| d  | 7  | 40  |

FIG. 3

| ID | BO | TTI |
|----|----|-----|
| b  | 3  | 40  |
| d  | 7  | 40  |
| c  | 3  | 20  |
| a  | 7  | 10  |

FIG. 4

| ID | BO | TTI |
|----|----|-----|
| d  | 7  | 40  |
| a  | 7  | 10  |
| b  | 3  | 40  |
| c  | 3  | 20  |

FIG. 5

WIRELESS NETWORK WITH A SELECTION OF TRANSPORT FORMAT COMBINATIONS

The invention relates to a wireless network comprising a radio network controller and a plurality of assigned terminals which are provided for transmitting useful data over logic channels which have different priorities, which are mapped onto exactly one transport channel, respectively.

From $3^{rd}$ Generation Partnership Project (3GPP); Technical Specification Group (TSG) RAN; Working Group 2 (WG2); Radio Interface Protocol Architecture; TS 25.302 V3.6.0) is known a wireless network which describes the function of the MAC layer (MAC=Medium Access Control). The packet data units formed in the RLC layer (RLC=Radio Link Control) are packed into transport blocks by the MAC layer, which transport blocks are transmitted by the physical layer over physical channels from the radio network controller to a terminal or vice versa. Apart from such a multiplex or demultiplex function, the MAC layer has the function of selecting suitable transport format combinations (TFC). A transport format combination represents a combination of transport formats for each transport channel. The transport format combination describes inter alia how the transport channels in the physical layer are multiplexed into a physical channel.

It is an object of the invention to provide a wireless network which indicates a selection process for finding a suitable transport format combination which then determines the transmission of transport blocks.

According to the invention the object is achieved by a wireless network comprising a radio network controller and a plurality of assigned terminals, which are each provided for transmitting transport blocks formed by packet data units of a logic channel over a transport channel to which a transmission time interval is assigned that comprises at least one radio frame and which transport channel is active when the beginning of its transmission time interval and that of a radio frame correspond, provided for forming at least a transport format combination, which combinations denote the transport blocks to be transmitted over each transport channel, successively provided for each logic channel to select a number of transport format combinations which permit the highest number or more than the highest number of available packet data units to be transmitted, while stored packet data units are taken into account of already considered logic channels which are also mapped onto the same transport channel, provided for selecting from the reduced number of transport format combinations the transport format combination that contains the lowest number of transport blocks while the already assigned inactive transport channels are taken into account.

The invention proposes a selection process for finding a suitable transport format combination in which first the transport format combinations in a recursion procedure are selected that are suitable for the transmission of the transport blocks provided for the various transport channels. The criterion here is that the transport format combinations are selected that permit the transmission of the highest number or more than the highest number of available packet data units while, taking stored packet data units into account of already considered logic channels which are also mapped onto the same transport channel. The second criterion is then the selection of such a transport format combination from the number reduced according to the first criterion, which enables the transmission of the lowest total number of transport blocks. It is then to be taken into account that for inactive transport channels no assignment can be given. In that case the already preselected number of transport blocks must be chosen.

A logic channel having a different priority is mapped onto exactly one transport channel. The radio network controller or a terminal performs the selection of a number of transport format combinations in the order of priority of the logic channels. The radio network controller or a terminal sorts the logic channels at the beginning of the transmission according to the priorities of the logic channels and, when there are logic channels having the same priority, according to the length of an underlying transmission time interval. At the beginning of each radio frame a sorting is performed according to the number of blocks waiting in the buffers of the logic channels, without taking the duration of the transmission time interval into account.

The MAC layer (MAC=Medium Access Control) of a radio network controller or of a terminal is provided for selecting a transport format combination and an RLC layer (RLC=Radio Link Control) of the radio network controller or of a terminal is provided for storing packet data units to be transmitted. The MAC layer then forms a transport block from a packet data unit delivered over a logic channel.

The invention also relates to a radio network controller and a terminal in the wireless network.

These and other aspects of the invention are apparent from and will be elucidated with reference to the embodiments described hereinafter.

Figure 2:
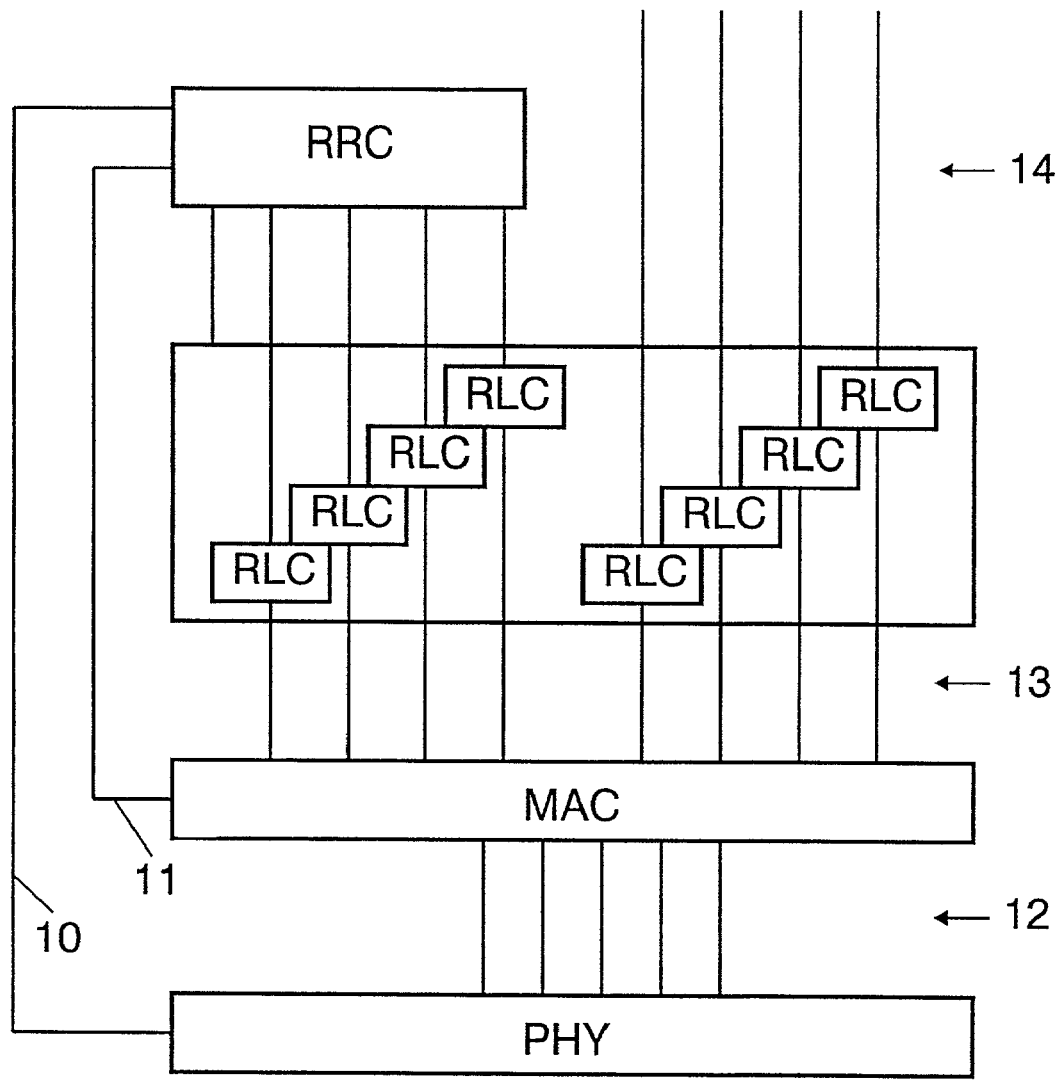
Figure 6:
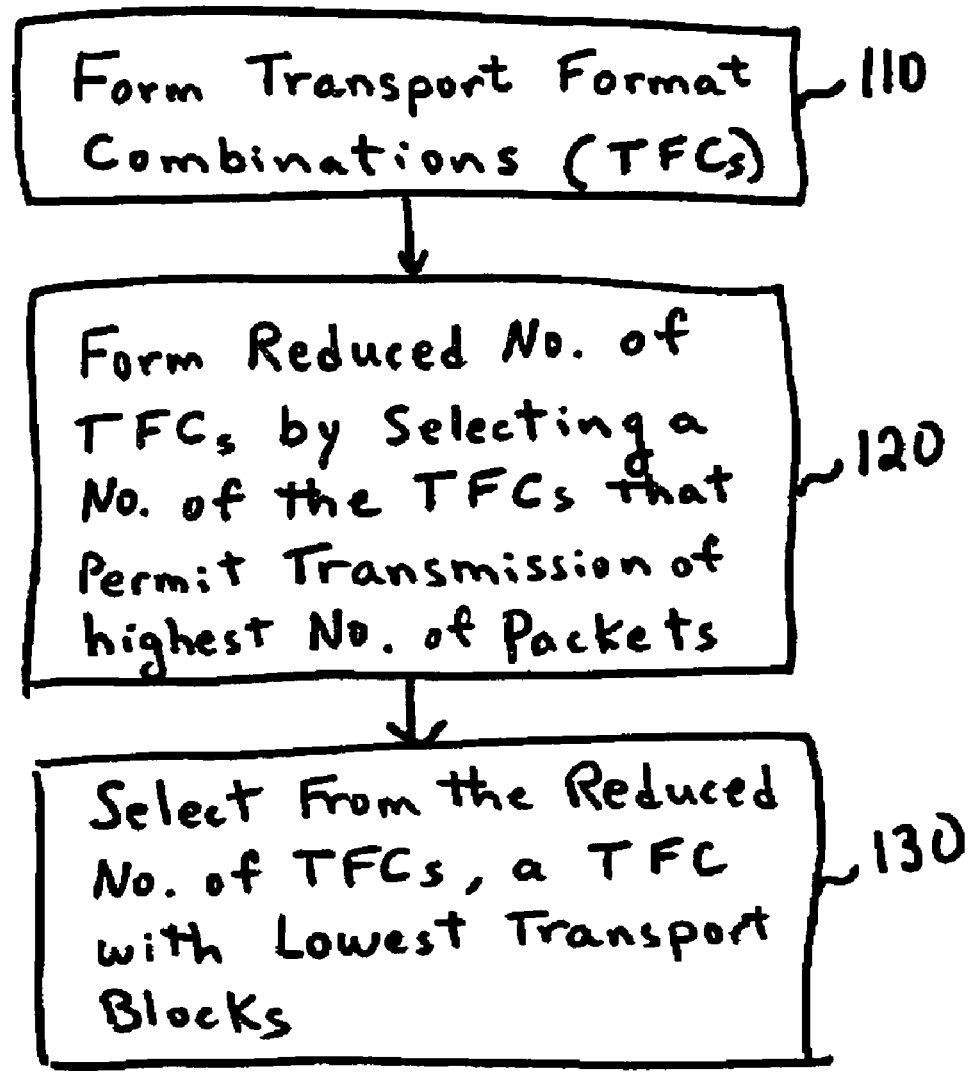

In the drawings:

FIG. 1 shows a wireless network comprising a radio network controller and a plurality of terminals, FIG. 2 shows a layer model for explaining various functions of a terminal or of a radio network controller, FIGS. 3 to 5 show various lists to explain the sorting schemes according to the invention, and FIG. 6 shows a flow chart explaining various functions of a terminal or of a radio network controller according to the invention.

FIG. 1 shows a wireless network, for example, a radio network, comprising a radio network controller (RNC) 1 and a plurality of terminals 2 to 9. The radio network controller 1 is responsible for controlling all the components that take part in the radio traffic such as, for example, the terminals 2 to 9. An exchange of control and useful data takes place at least between the radio network controller 1 and the terminals 2 to 9. The radio network controller 1 sets up a respective link for the transmission of useful data.

As a rule, the terminals 2 to 9 are mobile stations and the radio network controller 1 is fixedly installed. A radio network controller 1 may, however, also be movable or mobile, as appropriate.

In the wireless network are transmitted, for example, radio signals in accordance with the FDMA, TDMA or CDMA method (FDMA=frequency-division multiple access, TDMA=time-division multiple access, CDMA=code-division multiple access), or in accordance with a combination of the methods.

In the CDMA method, which is a special code spreading method, binary information (a data signal) coming from the user is modulated with a respective code sequence. Such a code sequence comprises a pseudo-random square-wave signal (pseudo-noise code), whose rate, also called chip rate, is generally considerably higher than that of the binary data. The duration of a square-wave pulse of the pseudo-random square-wave signal is referred to as a chip interval $T_C$. $1/T_C$ is the chip rate. The multiplication or modulation, respectively, of the data signal by the pseudo-random square-wave signal has a spreading of the spectrum by the spreading factor $N_C=T/T_C$ as a result, where T is the duration of the square-wave pulse of the data signal.

Useful data and control data are transmitted between at least one terminal (2 to 9) and the radio network controller 1 over channels predefined by the radio network controller 1. A channel is determined by a frequency range, the time range and, for example, in the CDMA method, by a spreading code. The radio link from the radio network controller 1 to the terminals 2 to 9 is referred to as a down-link and from the terminals to the base station as an up-link. Thus data are sent over down-link channels from the base station to the terminals and over up-link channels from the terminals to the base station.

The down-link control channel, for example, may be provided which is used for broadcasting to all the terminals 2 to 9, prior to a connection set-up, control data coming from the radio network controller 1. Such a channel is referred to as a down-link broadcast control channel. For transmitting control data from a terminal 2 to 9 to the radio network controller 1 prior to the connection set-up, for example, an up-link control channel assigned by the radio network controller 1 can be used, which, however, may also be accessed by other terminals 2 to 9. An up-link channel that can be used by various terminals or all the terminals 2 to 9 is referred to as a common up-link channel. After a connection set-up, for example, between a terminal 2 to 9 and the radio network controller 1, useful data are transmitted by a down-link and an up-link user channel. Channels that are set up only between one transmitter and one receiver are referred to as dedicated channels. As a rule, a user channel is a dedicated channel which may be accompanied by a dedicated control channel for transmitting link-specific control data.

For exchanging useful data between the radio network controller 1 and a terminal, it is necessary for a terminal 2 to 9 to be synchronized with the radio network controller 1. For example, it is known from the GSM system (GSM=Global System for Mobile communication), in which a combination of FDMA and TDMA methods is used, that after a suitable frequency range is determined based on predefined parameters, the position in time of a frame is determined (frame synchronization), with the aid of which frame the order in time for transmitting data is determined. Such a frame is always necessary for the data synchronization of terminals and base station in TDMA, FDMA and CDMA methods. Such a frame may contain several subframes, or together with various other successive frames, form a superframe.

The exchange of control and useful data via the radio interface between the radio network controller 1 and the terminals 2 to 9 can be explained with the layer model or protocol architecture shown by way of example in FIG. 2 (compare for example 3rd Generation Partnership Project (3GPP); Technical Specification Group (TSG) RAN; Working Group 2 (WG2); Radio Interface Protocol Architecture; TS 25.301 V3.6.0). The layer model comprises three protocol layers: the physical layer PHY, the data link layer having the sub-layers MAC and RLC (in FIG. 2 various objects of the sub-layer RLC are shown) and the layer RRC. The sub-layer MAC is equipped for Medium Access Control, the sub-layer RLC for Radio Link Control and the layer RRC for Radio Resource Control. The layer RRC is responsible for the signaling between the terminals 2 to 9 and the radio network controller 1. The sub-layer RLC is used for controlling a radio link between a terminal 2 to 9 and the radio network controller 1. The layer RRC controls the layers MAC and PHY via control links 10 and 11. By doing this, the layer RRC can control the configuration of the layers MAC and PHY. The physical layer PHY offers transport links 12 to the layer MAC. The layer MAC renders logic connections 13 available to the layer RLC. The layer RLC can be reached by applications via access points 14.

Packet data units are formed in the layer RLC and packed into transport blocks in the MAC layer, which transport blocks are transmitted by the physical layer via physical channels from the radio network controller to a terminal arid vice versa. In addition to such a multiplex or demultiplex function, respectively, the MAC layer has the function of selecting suitable transport format combinations (TFC) as shown in box 110 of FIG. 6. A transport format combination represents a combination of transport formats for each transport channel. The transport format combination describes inter alia how the transport channels are multiplexed in the physical layer into a physical channel (time multiplex).

Each transport format has a dynamic and a semi-static part. The dynamic part describes a transport block set (TBS) which is transmitted in a transport channel during a transmission time interval (TTI) and the semi-static part contains, for example, information about the type of the error correcting code. The semi-static part only changes by a reconfiguration of the physical channel. A transport block set is defined as a set of transport blocks which are exchanged between the physical layer and the MAC layer. The size of a transport block is determined by the number of bits of a packet data unit of the RLC layer and by the number of bits of added control information (header) of the MAC layer.

Only the dynamic part of the transport format is understood to be the transport format in the following.

A transmission time interval corresponds to a number of radio frames (RF) and is at least one radio frame. It indicates the number of radio frames during which the interleaving is effected. Interleaving is a transmit-side time-dependent nesting of information units (symbols) from successive radio frames. The MAC layer delivers a transport block set to the physical layer during each transmission time interval. The transmission time interval is specific of a transport channel and belongs to the semi-static part of the transport format. If the physical layer receives from the MAC layer a transport block set at the beginning of a transmission time interval which contains n radio frames, which transport block set is intended to be transmitted over a transport channel, each transport block of this set is divided into n segments (segmenting of transport blocks). The n segments of each transport block are transmitted in the n successive radio frames of the transmission time interval. All the n radio frames of the transmission time interval then have the same order of the segments.

The MAC layer is used for selecting the suitable transport format for each transport channel. With this selection the priorities of the logic channels between the RLC and the MAC layer are to be taken into account, which will be referred to as MAC priority (MAC Logical Priority=MLP), the buffer occupancy (BO) in the RLC layer, the transmission time interval (TTI) of the transport channels assigned to the logic channels, as well as sub-sets of transport format combinations. A buffer occupancy in the RLC layer includes packet data units which are to be transmitted from the RLC layer over the MAC layer to the physical layer. A sub-set of the transport format combination is a part of the possible total set of transport format combinations. Sub-sets are used for limiting the number of possible transport format combinations, because the number of bits by which the receiving side is shown what transport format combination was used for the transmission is also limited.

A transport channel (or the logic channel(s) mapped onto it) is (are) denoted inactive within the radio frame when the beginning of the radio frame does not correspond to the beginning of the transmission time interval of the transport channel. In the other case, it is called (they are called) active. With the shortest transmission time interval in accordance with the length of a radio frame of, for example, 10 ms, the assigned transport channel is never inactive, because a transport block needs to have at least this shortest transmission time interval for transmitting its data. With longer transmission time intervals (for example, 20 ms), a transport channel can be inactive in this sense.

In the MAC layer a procedure is executed at the beginning of each radio frame, which procedure sorts the active logic channels for each radio frame in accordance with the criteria mentioned above:
1. First a sorting is made according to the highest MAC priority.
2. When the MAC priority is the same, sorting is effected according to the buffer occupancy while the buffers having the most packet data units are shown at the beginning of the sorted list.
3. When the buffer occupancy and the MAC priorities are the same, a sorting is made according to the longest transmission time intervals.

When the procedure has established a list sorted according to the above criteria with logic channels which have data to be transmitted, from the beginning of the list with the highest MAC priority to the transmission time interval of the assigned transport channel tests are made for finding a suitable transport format. It should be borne in mind then that the transport format combination selected in the end leads to a sum data rate that does not exceed the total data rate which can be obtained with the predefined send power (this is referred to as data rate condition).

When this transport channel and, consequently, all logic channels which are mapped onto the transport channel, are inactive in one radio frame, the transport format for this transport channel can be taken from the transport format combination selected for the previous radio frame. In the other case, when the current logic channel (LC_X) is mapped onto an active transport channel (TC_Y), the MAC layer determines the best transport format that the transport channel TC_Y can offer to the RLC layer according to the transport format sets for the transmit packet data units in the buffer of the logic channel (LC_X) (while considering all the packet data units that were already assigned to the transport channel TC_Y during the query of logic channels having a higher priority, which are also mapped onto the assigned transport channel TC_Y). The best transport format is the transport format that allows the highest number of real useful data bits on the assigned transport channel TC_Y for the transmission. A reduced number of transport format combinations is formed by selecting transport format combinations that allow the highest number of or more than the highest number of available packet data units to be transmitted, as shown in box 120 of FIG. 6.

Since, as a rule, a plurality of transport channels onto which a plurality of logic channels are mapped are present, a transport format combination is to be found. In a recursion procedure over the logic channels the set of the possible transport format combinations is reduced successively. When the logic channel having the highest priority is queried, the starting point is the set of all the transport format combinations which satisfy the above condition of data rate or combined transport channels, respectively, or a sub-set thereof. The transport blocks of the logic channel, which, according to the selected transport format, can be transmitted, are referred to here as assigned for the transmission.

With all queries of a logic channel LC_Z that has a lower priority and is mapped onto a transport channel TC_Z, in the thus far reduced set of all possible transport format combinations those transport format combinations are selected that contain a transport format for the transport channel TC_Z, which at least allows M+N transport blocks to be transmitted. M is then the number of (already assigned) transport blocks of logic channels having a higher priority, which are mapped onto the transport channel TC_Z. N indicates the largest possible number of transport blocks that can be assigned for the transmission by the logic channel LC_Z according to the transport formats for the transport channel LC_Z, and of the packet data units waiting in the buffer of the logic channel LC_Z, which waiting packet data units are made into transport blocks via header completion: if, for example, 3 packet data units are waiting in the buffer of the logic channel LC_Z, and the transport format set for the transport channel TC_Z comprises only the formats 2 and 4, N=2.

The following examples explain why the condition "at least M+N transport blocks" (as against the condition "exactly M+N transport blocks") is necessary for determining the optimum transport format.

Since the size of the transport blocks within a given channel configuration is fixed, a transport format combination is only described by the number of transport blocks that are allowed per transport channel. The transport format combination (4, 2, 1) describes, for example, the combination of three transport formats (one for each transport channel), where:

4 transport blocks are allowed for the transport channel TC1
2 transport blocks are allowed for the transport channel TC2 and
1 transport block is allowed for the transport channel TC3.

If only two possible transport format combinations are given, for example, the transport format combination TFC1=(4, 2, 1), and the transport format combination TFC2=(2, 3, 2), and at least two logic channels LC1 and LC2 which are assigned to the first transport channel TC1, while the logic channel LC1 has the highest priority and the logic channel LC2 the lowest priority. This implies that all the other logic channels have priorities between these two extreme priorities. Furthermore, the current buffer occupancy (BO) of the logic channel LC1 is equal to BO(LC1)=3 and that of the logic channel LC2 is equal to BO(LC2)=1.

When the selection procedure for the transport format combination is executed not with the condition of "at least M+N transport blocks", but "exactly M+N transport blocks", and if the start is made with the logic channel LC1, which has the highest priority, the transport format having only two blocks would be selected, which blocks are allowed for transport channel TC1 and the transport format combination TFC2=(2, 3, 2) would end. This means that 2 transport blocks are transmitted by the transport channel TC1 with M=0 and N=2 (where the two transport blocks originate from the logic channel LC1 and no transport block from the logic channel LC2, because the addition of a block by the logic channel LC2 would not produce a valid transport format combination), 3 transport blocks are transmitted by the transport channel TC2 and 2 transport blocks by the transport channel TC3.

When taking the condition "at least M+N transport blocks" into account, transport formats would be selected from the transport channel TC1, which formats allow the transmission of 3 or more transport blocks (M=0, N=3). However, not more than 3 transport blocks can be delivered by the logic channel LC1. In the following the selection process would receive 2 transport blocks from other logic channels not further described here for the transport channel TC2 and one transport block for the transport channel TC3 in accordance with the selected transport format combination TFC1=(4, 2, 1). Finally, the selection process arrives at the last logic channel LC2 with BO=1. Since still only 3 transport blocks are assigned to the transport channel TC1, the selection process would allow the logic channel LC2 to add an additional transport block for the transport channel TC1 This would mean that the transport format combination TFC1 is a valid transport format combination, because now 4 transport blocks are present for the transport channel TC1 (3 transport blocks from the logic channel LC1 and 1 transport block from the logic channel LC2), 2 transport blocks for the transport channel TC2 and one transport block for the transport channel TC3. This fully satisfies the selection criteria to receive as many transport blocks as possible from the logic channel having the higher priority, whereas this selection criterion is not satisfied when the condition "exactly M+N transport blocks" is used.

The use of the condition "exactly M+N transport blocks" may even cause the priority between the logic channel LC1 and the logic channel LC2 to be reversed, which priorities are assigned to the same transport channel. By way of illustration further transport format combinations TFC3=(2, 2, 1), TFC4=(0, 2, 1) and TFC5=(0, 1, 1) are presupposed. Furthermore, it is pre-supposed that the buffer occupancies BO(LC1)=1 and BO(LC2)=2, whereas the buffer occupancies BO(LC3)-2 and BO(LC4)=1. With the condition "exactly M+N transport blocks", the MAC layer would establish that the logic channel LC1 cannot send a transport block, because no transport format combination (1, . . . ) with M=0 and N=0 is available. Therefore, the transport format combination TFC4 would be selected, so that the highest data rate is possible. The number of stored packet data units and the resulting transport blocks of the logic channels LC3 and LC4 exactly fit in this selected transport format combination, so that in the course of the selection process no further change will take place. If, finally, the logic channel LC2 is selected, this channel can render 2 transport blocks available and the selected transport format combination becomes the transport format combination TFC3. This leads to the fact that the logic channel LC1, which has the highest priority, cannot send the transport block, whereas the logic channel LC2, which has the lowest priority, can send 2 transport blocks. In consequence, the predefined priorities are ignored. The use of the condition "at least M+N transport blocks" would on the other hand lead to the fact that the logic channel LC1 and the logic channel LC2 can send a transport block each, so that the predefined priorities are taken into account.

After a complete transport format combination has been calculated for one radio frame, the MAC layer requests the RLC layer to send the calculated number of transport blocks to the MAC layer. Subsequently, the generated sets of transport blocks (one set for each transport channel) are transmitted to the physical layer. The physical layer then inserts the received sets of transport blocks into a radio frame in accordance with the selected transport format combination, while the segmentation is considered of transport blocks when the transmission time interval contains more than one radio frame.

The procedure described above for selecting an optimal transport format combination for the next radio frame first draws up a list sorted according to three criterions. As is shown, the first criterion is the sorting of the logic channels according to their MAC priority. Only if several logic channels have the same logic priority, will the largest of the buffers in the RLC layer be considered. The longest transmission time interval is the third criterion if the first two parameters are the same. Since the priority of the MAC layer and the transmission time interval are semi-static parameters (generally the parameter can only be changed by a reconfiguration of a transport channel), but the size of the buffers may vary from one radio frame to the next, the above sorting can be made according to the following scheme with the same sorting result.

After a reconfiguration of a transport channel, which reconfiguration may imply, for example, that a further transport channel is added or an available transport channel is removed, the logic channels are sorted once 1. according to their MAC priority (MLP),
2. and for all the logic channels that have the same MAC priority (MLP), according to their transmission time interval (TTI) in falling length.

At the beginning of each radio frame the then active logic channels having the same MAC priority in the ordered list are then resorted only according to the buffer occupancies (longest buffer first), while the length of the transmission time interval (TTI) is then ignored. In accordance with this sorting, the MAC layer then queries the RLC buffers of the individual logic channels depending on the number of transport blocks to be transmitted and selects the most favorable available transport format (i.e. the format allowing the highest data rate). The thus defined sorting then saves two sorting steps at the beginning of each radio frame.

An example of this sorting scheme is shown in FIGS. 3 to 5. FIG. 3 represents an unsorted list having the same priorities of the MAC layer, where ID is an identification for the logic channels, BO the buffer occupancy of packet data units which are to be transmitted over an assigned logic channel, and TTI is the transmission time interval of the assigned transport channel. The unsorted list has four logic channels having ID=a, b, c and d. BO=7 and TTI=10 are assigned to the logic channel having the ID=a, BO=3 and TTI=40 are assigned to the logic channel having the ID=b, BO=3 and TTI=20 are assigned to the logic channel having the ID=c and BO=7 and TTI=40 are assigned to the logic channel having the ID=d. FIG. 4 shows the list which is sorted in accordance with the longest transmission time intervals TTI. Subsequently, the logic channels are sorted according to the size of the buffer occupancies BO while the transmission time intervals TTI are discarded. This sorted list is shown in FIG. 5.

The selection procedure of the transport format combination in the MAC layer is described formally in the following.

The logic channels are referred to as 1, . . . , P1, which are active at the beginning of the radio frame concerned and are sorted according to the procedure described above. The logic channel having the running number 1 has the highest priority P and the logic channel having the running number P1 the lowest priority P.

S is the set of all the transport format combinations that lead to data rates which can still be achieved with the maximum transmission power of the terminal under consideration, or a sub-set thereof.

The procedure has the following sequence of events for the active logic channels in the current radio frames:

Start with the Running Number P:=1
1. Set the set S0 equal to set S.
2. If S0 contains a single transport format combination, this transport format combination is selected and the procedure ends. Otherwise continue with step 3.
3. Now set the set S equal to the set of all the transport format combinations in S0, which allow the transmission of the highest number of available data bits of the logic channel with the running number P or more than this highest number (while considering the packet data units in the buffers of already examined logic channels which are mapped onto the same transport channel).
4. P:=P+1
5. If P>P1:

As shown in box 130 of FIG. 6, the transport format combination is selected in S0, which combination allows of the transmission of the lowest number of useful data bits, while the number of transport blocks are taken into account that have already been assigned to the inactive transport channels in the present radio frames. This may mean that the currently active logic channels have to generate filler packet data units (i.e. these packet data units do not evolve from real useful data) if the transport format combinations found only allow the transmission of more transport blocks than there are packet data units in the buffer. This terminates the procedure.

Otherwise: back to step 1.

The following example illustrates the procedure:

Four logic channels LC1, LC2, LC3 and LC4 are assumed to be given (with decreasing MAC priority MLP). The logic channels LC1 and LC3 are assumed to be the same transport channel TC1 (transmission time interval TTI1=10 ms), whereas the logic channel LC2 is assumed to be TC2 (transmission time interval TTI2=20 ms) and the logic channel LC4 is assumed to be TC3 (transmission time interval TTI3=40 ms). The transport formats for a transport channel are assumed to be given as a number of bit blocks of a predefined length. The bit blocks of various transport channels may have different lengths.

The set TF1 of transport formats of the transport channel TC1 is assumed to be TF1={0, 1, 2, 3, 4}, the set TF2 of the transport formats of transport channel TC2 is assumed to be TF2={0, 1, 2} and that of the transport channel TC3 is assumed to be TF3={0, 1}. The resulting product set represents the set of all possible transport format combinations.

Furthermore, as a set of possible transport format combinations is assumed to be predefined only the following sub-set of the product set TFC_START={(0,0,0), (1,0,0), (3,0,0), (4,0,0),
(0,0,1), (1,0,1), (3,0,1), (4,0,1),
(0,1,0), (1,1,0), (3,1,0), (4,1,0),
(0,1,1), (1,1,1), (3,1,1), (4,1,1),
(0,2,0), (1,2,0), (3,2,0), (4,2,0),
(0,2,1), (1,2,1), (3,2,1), (4,2,1)}, in which the combinations (2,0,0), (2,0,1), (2,1,0), (2,1,1), (2,2,0) and (2,2,1) are lacking. It is assumed that the format combinations contained in TFC+_START lead to data rates which can be supported with the maximum data rate.

Let the radio frame RF1 be a radio frame at which the three different transmission time intervals TTI1, TTI2 and TTI3 begin. In this radio frame all three transport channels are active. The occupancies BO of the buffers of the associated logic channels are assumed to be as follows at the beginning of this radio frame
BO(LC1)=2
BO(LC2)=1
BO(LC3)=1
BO(LC4)=1

The procedure now queries the logic channels from the beginning. An inspection of the logic channel LC1 produces as a reduced set of the possible transport format combinations:
{(1,0,0), (3,0,0), (4,0,0),
(1,0,1), (3,0,1), (4,0,1),
(1,1,0), (3,1,0), (4,1,0),
(1,1,1), (3,1,1), (4,1,1),
(1,2,0), (3,2,0), (4,2,0),
(1,2,1), (3,2,1), (4,2,1)}, where, for example, the format combinations (1,0,0), (1,0,1), (1,1,0), (1,1,1), (1,2,0), (1,2,1) allow to transmit the highest number of available data bits of the logic channel LC1 (2 transport blocks are available, it is true, but there is no format combination that allows to transmit the two transport blocks on TC1), whereas the other format combinations allow to transmit more than this highest number of available data bits.

An inspection of the logic channel LC2 produces as a further reduced set of the possible transport format combinations:
{(1,1,0), (3,1,0), (4,1,0),
(1,1,1), (3,1,1), (4,1,1),
(1,2,0), (3,2,0), (4,2,0),
(1,2,1), (3,2,1), (4,2,1)}, since exactly 1 transport block or more than 1 transport block, that is, 2 transport blocks can be transmitted over the transport channel TC2.

An inspection of the logic channel LC3 produces as a further reduced set of the possible transport format combinations:
{(3,1,0), (4,1,0),
(3,1,1), (4,1,1),
(3,2,0), (4,2,0),
(3,2,1), (4,2,1)}, because the one transport block of the logic channel LC3 or more than this transport block can be transmitted with the two transport blocks of the logic channel C1.

An inspection of the logic channel LC4 finally produces the reduced set:
{(3,1,1), (4, 1,1),
(3,2,1), (4,2,1)}

The transport format combination (3,1,1) determines the lowest useful data rate of these four combinations and thus satisfies the break-off criterion.

In the next radio frame RF2 only the transport channel TC1 is active, i.e. only the logic channels LC1 and LC3 are active and to be inspected. Let the buffer occupancies in this case be given by
BO(LC1)=2
BO(LC3)=0

An inspection of the logic channel LC1 produces the reduced set of possible transport format combinations from TFC_START:
{(1,0,0), (3,0,0), (4,0,0), (1,0,1), (3,0,1), (4,0,1),
(1,1,0), (3,1,0), (4,1,0),
(1,1,1), (3,1,1), (4,1,1),
(1,2,0), (3,2,0), (4,2,0),
(1,2,1), (3,2,1), (4,2,1)}, Inspection of the logic channel LC3 produces the same set of the possible transport format combinations:
{(1,0,0), (3,0,0), (4,0,0),
(1,0,1), (3,0,1), (4,0,1), (1,1,0), (3,1,0), (4,1,0), (1,1,1), (3,1,1), (4,1,1), (1,2,0), (3,2,0), (4,2,0), (1,2,1), (3,2,1), (4,2,1)}, When the respective one transport block for TC2 and TC3 is taken into account, which is assigned for the transmission in the previous radio frame RF1, the abort condition results in the format combination (1, 1, 1). Only this format combination allows the transmission (of the segments) of the transport blocks already assigned for the transport channels TC2 and TC3 when the resulting data rate is at the same time the lowest of all the possible transport format combinations. If the format combination (1, 1, 1) were not contained in TFC_START, the transport format combination (3, 1, 1) would have to be selected instead, so that the logic channel LC1 can transmit the two packet data units, and the logic channel LC1 (or LC3) would have to generate a filler packet data unit which does not carry useful data.

The invention claimed is:

1. A wireless network comprising a radio network controller and a plurality of terminals,
    wherein at least one of said radio network controller and one of said plurality of terminals is configured for:
    transmitting transport blocks formed by packet data units of a logic channel over a transport channel to which a transmission time interval is assigned that comprises at least one radio frame and which transport channel is active when the beginning of its transmission time interval and that of a radio frame correspond,
    forming at least a transport format combination, which combinations denote the transport blocks to be transmitted over each transport channel,
    forming a reduced number of transport format combinations by selecting, for each logic channel, a number of transport format combinations which permit the highest number or more than the highest number of available packet data units to be transmitted, while taking stored packet data units into account of already considered logic channels which are also mapped onto the same transport channel, and
    selecting from the reduced number of transport format combinations the transport format combination that contains the lowest number of transport blocks and does not include inactive transport channels.

2. A wireless network as claimed in claim 1, characterized in that logic channels having different priorities are mapped onto exactly one transport channel and in that the radio network controller or said one of said plurality of terminals is configured for making the selection of a number of transport format combinations in the order of priority of the logic channels.

3. A wireless network as claimed in claim 2, characterized in that the radio network controller or said one of said plurality of terminals is configured for performing a sorting of the logic channels at the beginning of the transmission according to the priorities of the logic channels and, with equal priority of the logic channels, according to the length of a transmission time interval used as the basis, whose duration corresponds at least to one radio frame, and at the beginning of each radio frame, the radio network controller or said one of said plurality of terminals is further configured for making a sorting according to the number of blocks waiting in the buffers of the logic channels without considering the duration of the transmission time interval.

4. A wireless network as claimed in claim 1, characterized in that a MAC layer (MAC=Medium Access Control) of the radio network controller or of said one of said plurality of terminals is configured for selecting a transport format combination.

5. A wireless network as claimed in claim 4, characterized in that an RLC layer (PLC=Radio Link Control) of the radio network controller or of said one of said plurality of terminal is configured for storing packet data units provided for transmission and the MAC layer is configured for forming a transport block from a packet data unit delivered over a logic channel.

6. A radio network controller of a wireless network comprising a plurality of terminals, wherein the radio network controller is configured for:
    transmitting transport blocks formed by packet data units of a logic channel over a transport channel to which a transmission time interval is assigned that comprises at least one radio frame and which transport channel is active when the beginning of its transmission tame interval and that of a radio frame correspond,
    forming at least a transport format combination, which combinations denote the transport blocks to be transmitted over each transport channel,
    forming a reduced number of transport format combinations by selecting, for each logic channel, a number of transport format combinations which permit the highest number or more than the highest number of available packet data units to be transmitted, while taking stored packet data units into account of already considered logic channels which are also mapped onto the same transport channel, and
    selecting from the reduced number of transport format combinations the transport format combination that contains the lowest number of transport blocks and does not include inactive transport.

7. A terminal of a wireless network comprising a radio network controller,
    wherein said terminal is configured for:
    transmitting transport blocks formed by packet data units of a logic channel over a transport channel to which a transmission time interval is assigned that comprises at least one radio frame and which transport channel is active when the beginning of its transmission time interval and that of a radio frame correspond,
    forming at least a transport format combination, which combinations denote the transport blocks to be transmitted over each transport channel,
    forming a reduced number of transport format combinations by selecting, for each logic channel, a number of transport format combinations which permit the highest number or more than the highest number of available packet data units to be transmitted while stored packet data units are taken into account of already considered logic channels which are also mapped onto the same transport channel, and
    selecting from the reduced number of transport format combinations the transport format combination that contains the lowest number of transport blocks and does not include inactive transport channels.

8. The terminal of claim 7, wherein logic channels having different priorities are mapped onto exactly one transport channel and wherein the radio network controller or a terminal is provided for making the selection of a number of transport format combinations in the order of priority of the logic channels.

9. The terminal of claim 7, wherein the radio network controller or the terminal is configured for performing a sorting of the logic channels at the beginning of the transmission according to the priorities of the logic channels and, with equal priority of the logic channels, according to the length of a transmission time interval used as the basis, whose duration corresponds at least to one radio frame, and wherein, at the beginning of each radio frame, the radio network controller or the terminal is further configured for making a sorting according to the number of blocks waiting in the buffers of the logic channels without considering the duration of the transmission time interval.

10. The terminal of claim 7, wherein a medium access control (MAC) layer of the radio network controller or of the terminal is configured for selecting a transport format combination.

11. The terminal of claim 10, wherein a radio link control layer of the radio network controller or of the terminal is configured for storing packet data units provided for transmission, and the MAC layer is configured for forming a transport block from a packet data unit delivered over a logic channel.

12. A radio network controller as claimed in claim 6, wherein logic channels having different priorities are mapped onto exactly one transport channel, and wherein the radio network controller or one of the plurality of terminals is configured for making the selection of a number of transport format combinations in the order of priority of the logic channels.

13. The radio network controller of claim 6, wherein the radio network controller or one of the plurality of terminals is configured for performing a sorting of the logic channels at the beginning of the transmission according to the priorities of the logic channels and, with equal priority of the logic channels, according to the length of a transmission time interval used as the basis, whose duration corresponds at least to one radio frame, and wherein, at the beginning of each radio frame, the radio network controller or the one of the plurality of terminals is configured for making a sorting according to the number of blocks waiting in the buffers of the logic channels without considering the duration of the transmission time interval.

14. The radio network controller of claim 6, wherein a medium access control (MAC) layer of the radio network controller or of the one of the plurality of terminals is configured for selecting a transport format combination.

15. The radio network controller of claim 14, wherein a radio link control layer of the radio network controller or of the one of the plurality of terminals is configured for storing packet data units provided for transmission, and the MAC layer is configured for forming a transport block from a packet data unit delivered over a logic channel.

16. A method of wireless communication between a radio network controller and a terminal, comprising the acts of:

transmitting transport blocks formed by packet data units of a logic channel over a transport channel to which a transmission time interval is assigned that comprises at least one radio frame and which transport channel is active when the beginning of its transmission time interval and that of a radio frame correspond;

forming at least a transport format combination, which combinations denote the transport blocks to be transmitted over each transport channel;

forming a reduced number of transport format combinations by selecting, for each logic channel, a number of transport format combinations which permit the highest number or more than the highest number of available packet data units to be transmitted, while taking stored packet data units into account of already considered logic channels which are also mapped onto the same transport channel; and selecting from the reduced number of transport format combinations a transport format combination that contains the lowest number of transport blocks and does not include inactive transport channels.

17. The method of claim 16, further comprising the acts of:

mapping logic channels having different priorities onto exactly one transport channel; and making the selection of a number of transport format combinations in the order of priority of the logic channels.

18. The method of claim 16, further comprising the acts of:

performing a sorting of the logic channels at the beginning of the transmission according to the priorities of the logic channels and, with equal priority of the logic channels, according to the length of a transmission time interval used as the basis, whose duration corresponds at least to one radio frame; and at the beginning of each radio frame, making a sorting according to the number of blocks waiting in the buffers of the logic channels without considering the duration of the transmission time interval.

19. The method of claim 16, further comprising the act of selecting a transport format combination by a medium access control layer of the radio network controller or of the terminal.

20. The method of claim 19, further comprising the acts of:

storing, by a radio link control layer of the radio network controller or of the terminal, packet data units provided for transmission; and forming, by the medium access control layer, a transport block from a packet data unit delivered over a logic channel.

* * * * *